United States Patent [19]
Kim

[11] Patent Number: 5,832,256
[45] Date of Patent: Nov. 3, 1998

[54] SYSTEM CLOCK RECOVERY APPARATUS FOR MPEG DECODING SYSTEM

[75] Inventor: Seong-bong Kim, Seoul, Rep. of Korea

[73] Assignee: Samsung Electronics Co., LTD., Kyungki-do, Rep. of Korea

[21] Appl. No.: 741,012

[22] Filed: Oct. 30, 1996

[30] Foreign Application Priority Data

Oct. 30, 1995 [KR] Rep. of Korea ............... 95-38275

[51] Int. Cl.⁶ ............... G06F 1/04; G06F 1/08
[52] U.S. Cl. ............... 395/556; 395/559
[58] Field of Search ............... 395/555, 556, 395/558, 559; 348/500, 423, 497, 512; 375/354, 355, 371

[56] References Cited

U.S. PATENT DOCUMENTS

| | | | |
|---|---|---|---|
| 5,287,182 | 2/1994 | Haskell et al. | 348/500 |
| 5,521,927 | 5/1996 | Kim eta al. | 370/94.2 |
| 5,559,999 | 9/1996 | Maturi et al. | 395/551 |
| 5,565,924 | 10/1996 | Haskell et al. | 348/423 |
| 5,652,627 | 7/1997 | Allen | 348/497 |

*Primary Examiner*—Dennis M. Butler
*Attorney, Agent, or Firm*—Sughrue, Mion, Zinn, Macpeak & Seas, PLLC

[57] ABSTRACT

A system clock recovery apparatus in an MPEG decoding system for decoding a received system coded stream in the form of a transport stream or a program stream, includes a depacketizer for depacketizing the received stream and outputting decoding time data for representing a video decoding time, a system clock value and a video elementary stream, a detector for detecting a delayed value of a video buffering verifier (VBV) using the video elementary stream of the depacketizer and generating a detection indication signal for indicating a detected point of time of the delayed value of the VBV, and a system clock generator for varying the current system clock and the current system time clock according to the decoding time data and the system clock value of the depacketizer and the VBV delayed value and the detection indication signal of the detector.

9 Claims, 4 Drawing Sheets

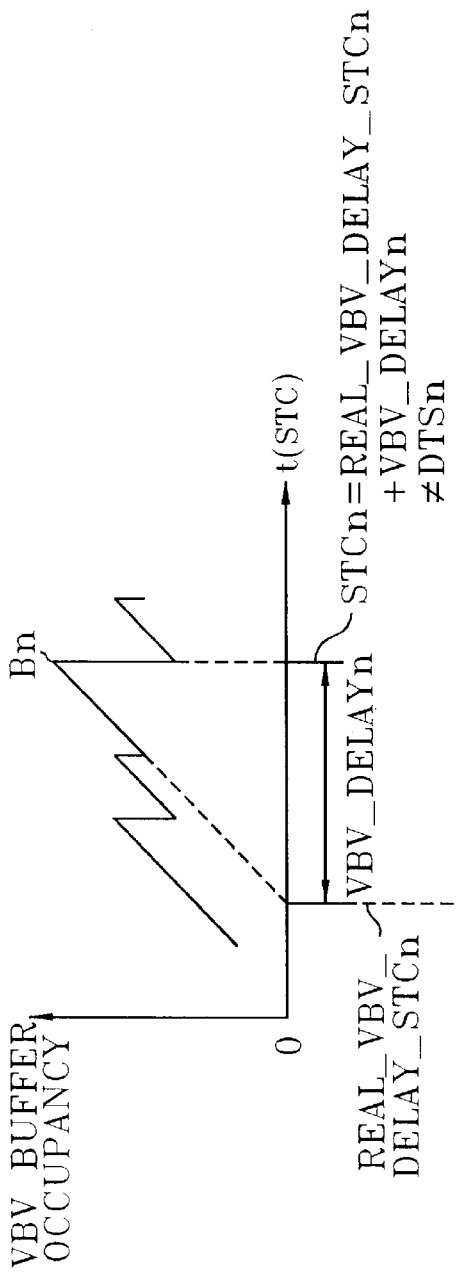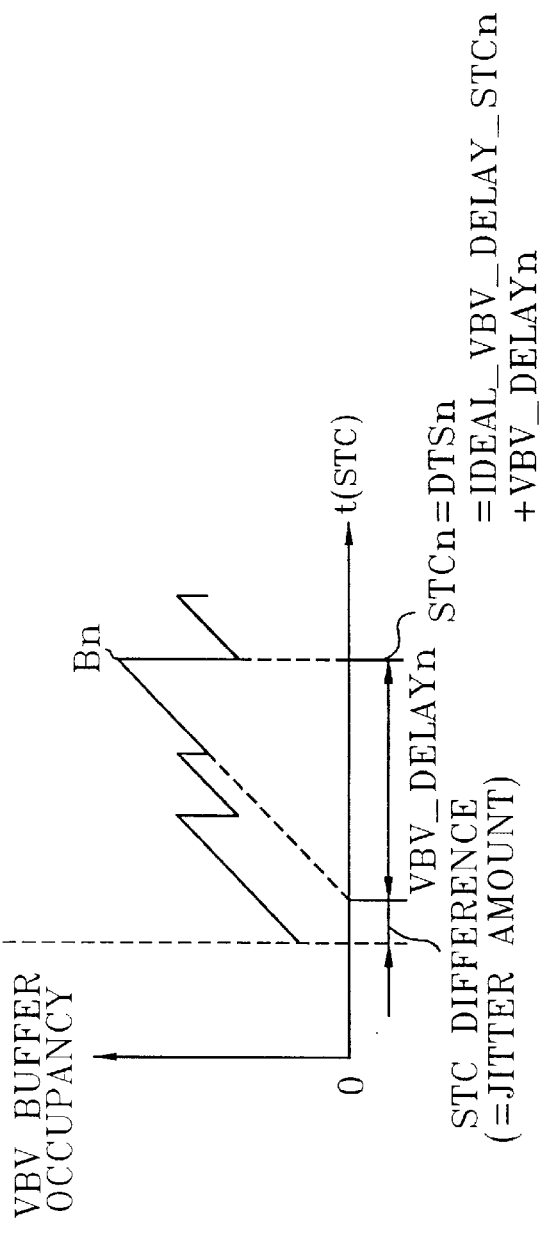
FIG.3A
FIG.3B

SYSTEM CLOCK RECOVERY APPARATUS FOR MPEG DECODING SYSTEM

BACKGROUND OF THE INVENTION

The present invention relates to a system clock recovery apparatus for an MPEG decoding system, and more particularly, to a system clock recovery apparatus for an MPEG decoding system in which a system clock can be correctly generated even when jitters occur in a program clock reference (PCR) within a transport stream or a system clock reference (SCR) within a program stream.

In an MPEG coding system, one or more elementary streams of video and audio data, as well as other data, are combined into single or multiple streams which are suitable for storage or transmission. In order to perform coding in this system, video and audio data are encoded according to the MPEG international standard, and the resulting compressed elementary streams are packetized to produce packetized elementary stream (PES) packets. The PES packets are combined in the form of a program stream (hereinafter referred to as a PS stream) or a transport stream (hereinafter referred to as a TS stream) to be recorded on a storage medium or to be transmitted.

The PS stream is designed to be used in circumstances in which errors do not occur, while the TS stream is designed to be used circumstances in which errors occur, such as storage in or transmission from a medium having loss or noise. Since the PS and TS streams can be mutually converted into the other, a structure of a TS stream will be described below with reference to FIGS. 1A through 1D.

A video elementary stream of FIG. 1A includes a picture start code and a video buffering verifier (VBV) delay value (vbv_delay) in every picture, and is used for forming a PES packet shown in FIG. 1B. The PES packet includes PES packet data having a picture start code, VBV delay data and video data and a PES packet header. The PES packet header contains a decoding time stamp (DTS) representing a decoding time. As shown in FIG. 1C, a TS packet includes a TS packet header containing a PCR representing a value of a system clock and a payload in a TS stream. Part of the PES packet is loaded in the payload. The TS packets are multiplexed to form a TS stream shown in FIG. 1D. In FIG. 1D, "V" represents video data, "A" represents audio data and "D" represents other data. The audio data and the other data is packetized in a manner similar to that of the video data. Also, in case of the PS stream, the SCR represents a system clock value in the same manner as that of the PCR.

A phase-locked loop (PLL) circuit which is associated with recovery of a system clock and a technology which is associated with SCR and PCR jitters is disclosed in "IMPEG-2 system CD in ISO/IEC 1-13818", Nov. 8, 1993, pp. 89–93. The PLL circuit in a decoding system which receives a TS stream or a PS stream recovers a system clock based on a PCR or a SCR. The recovered clock is used for generation of a composite video sample clock and a color subcarrier.

However, after re-multiplexing or network transmission, there exists a difference between a PCR or SCR value which is actually in a decoding system and an original value produced in an encoding system. Such timing jitters create fluctuation of the system clock frequency, and cause a problem in that the recovered system clock cannot be used in a decoding system.

SUMMARY OF THE INVENTION

To solve the above problem, it is an object of the present invention to provide a system clock recovery apparatus in an MPEG decoding system for correctly generating a system clock, using a received transport stream or a received program stream, even when program clock reference jitters or system clock reference jitters are generated.

To accomplish the above object of the present invention, there is provided a system clock recovery apparatus in a decoding system for decoding a received system coded stream in the form of a transport stream or a program stream of MPEG, the system clock recovery apparatus comprising:

depacketizer means for depacketizing the received stream and outputting decoding time data for representing a video decoding time, a system clock value and a video elementary stream;

detection means for detecting a delayed value of a video buffering verifier (VBV) using the video elementary stream of the depacketizer means, and generating a detection indication signal for indicating a detected point of time of the delayed value of the VBV; and system clock generation means for varying a current system clock and a current system time clock according to the decoding time data and the system clock value of the depacketizer means and the VBV delayed value and the detection indication signal of the detection means.

BRIEF DESCRIPTION OF THE DRAWINGS

The preferred embodiments are described with reference to the drawings wherein:

FIGS. 3A and 3B are views for explaining the relationship between a system time clock (STC) involving program clock reference (PCR) jitters or system clock reference (SCR) jitters, and a decoding time stamp (DTS).

DETAILED DESCRIPTION OF THE PREFERRED EMBODIMENT

A preferred embodiment of the present invention will be described below in more detail with reference to the accompanying drawings.

Figure 1:
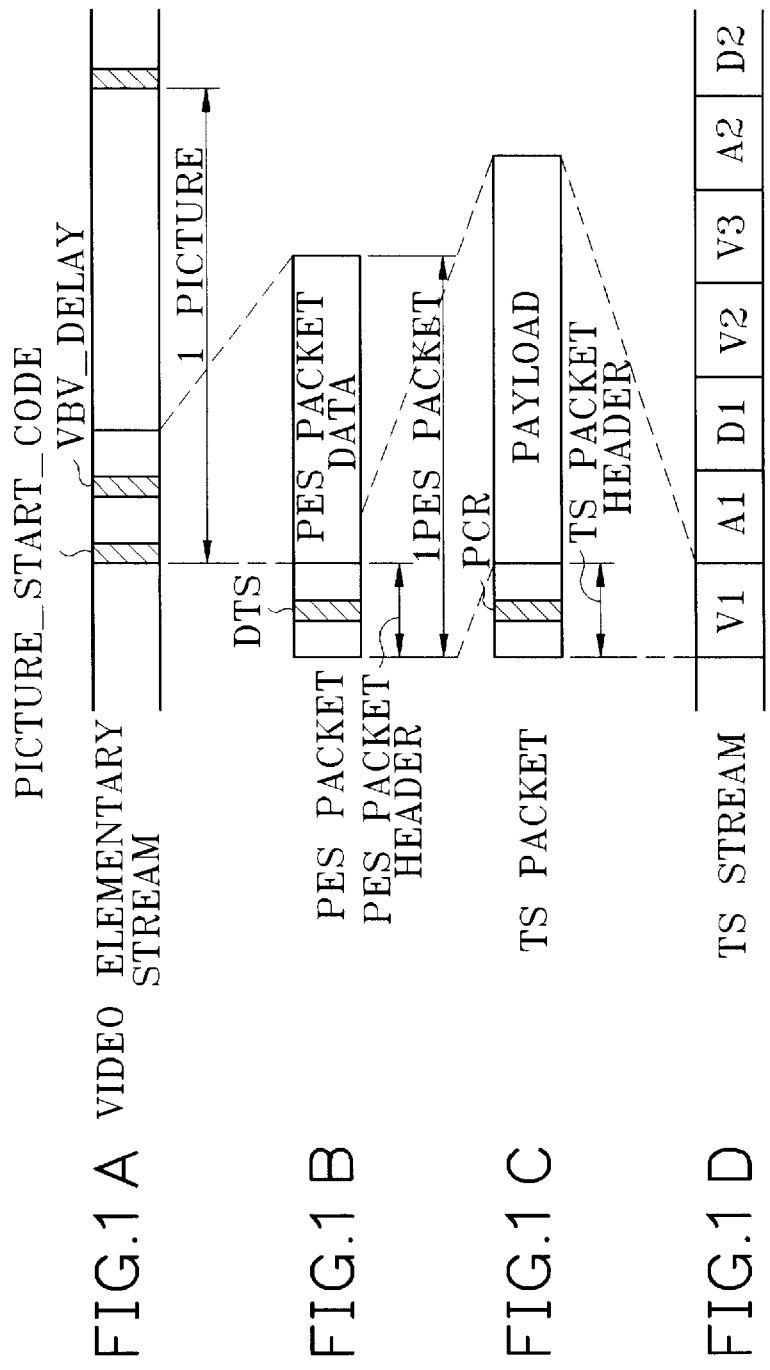
FIGS. 1A through 1D are views for explaining a structure of an MPEG transport stream.
Figure 2:
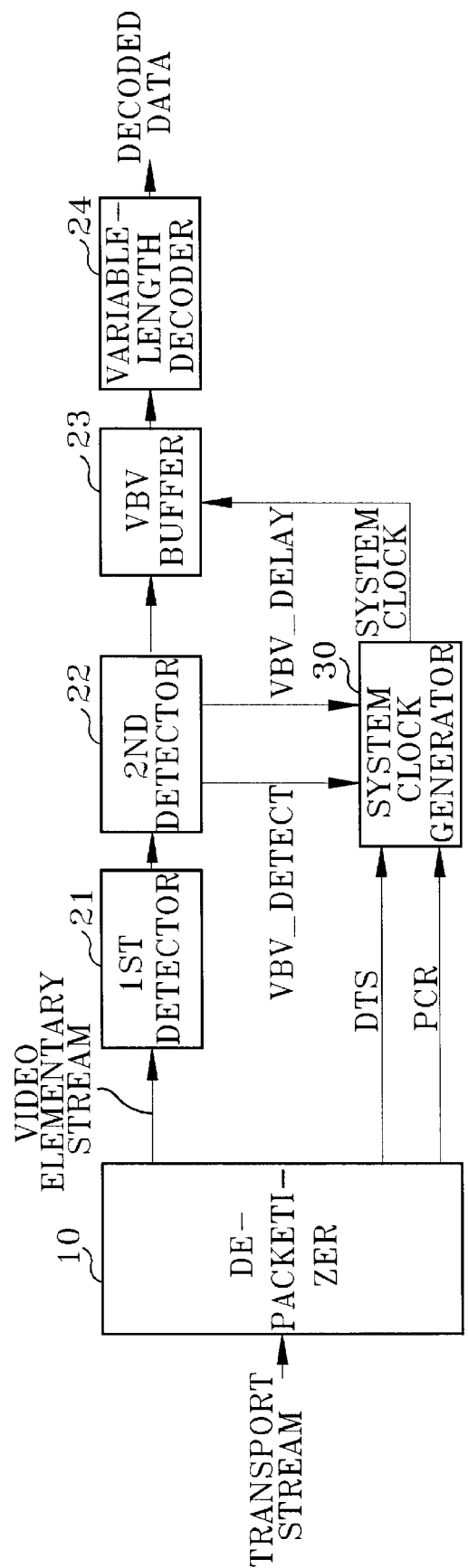
FIG. 2 is a block diagram showing a system clock recovery apparatus according to a preferred embodiment of the present invention.

Referring to FIG. 2 showing a system clock recovery apparatus using a TS stream shown in FIG. 1, a depacketizer 10 depacketizes a received TS stream and obtains a video elementary stream, a DTS and a PCR. When re-multiplexing, the PCR, the point of time of the DTS and the point of time of the VBV delayed value vbv_delay (to be described later) are detected with no relationship among these parameters. As a result, the PCR has jitters. The depacketizer 10 outputs the obtained DTS and the PCR to a system clock generator 30, and outputs the video elementary stream to a first detector 21. The depacketizer 10 is designed so that it is latched via an internal latch until a VBV delayed value vbv_delay is detected from a PES packet having the same DTS.

The first detector 21 detects a picture start code from the received video elementary stream and outputs the received video elementary stream, together with the detected picture start code, to a second detector 22. The second detector 22 detects a VBV delayed value which exists in every picture based on the picture start code detected in the first detector 21. The second detector 22 outputs a detection indication signal (vbv_detect), indicating the detection of the VBV delayed value, each time that the VBV delayed value is detected, and outputs the detected VBV delayed value (vbv_delay) to the system clock generator 30. The second detector 22 also outputs the data input from the first detector 21 to a VBV buffer 23. The VBV buffer 23 outputs the stored data to a variable-length decoder 24 according to the STC supplied from the system clock generator 30. The VBV buffer 23 outputs the stored data to the variable-length decoder 24 according to a buffer occupancy indicative of a degree of data storage. In more detail, the VBV buffer 23 outputs the stored data to the variable-length decoder 24 when the buffer occupancy satisfies the following equation (1).

$$vbv\_delay_n = (90{,}000 \times B_n)/R \qquad (1)$$

Here, $vbv\_delay_n$ is a VBV delayed value of the n-th picture, $B_n$ is a buffer occupancy with respect to the n-th picture, and R is a transmission rate of the video elementary stream. The VBV buffer 23 outputs the stored data to the variable-length decoder 24, at the time when the buffer occupancy becomes $B_n$, from which time variable-length decoding starts. Therefore, the point of time when an actual buffer occupancy of the VBV buffer 23 becomes $B_n$ becomes a start point of time of the variable-length decoding. The variable-length decoder 24 performs a well-known variable-length decoding operation with respect to the data supplied from the VBV buffer 23 and outputs the decoded data.

Meanwhile, the system clock generator 30 generates a correct system clock using the DTS and the PCR of the depacketizer 10 and the VBV delayed value and the detection indication signal of the second detector 22, even when jitters occur in the PCR. Prior to explaining the system clock generator 30, a difference of a variable-length decoding start point of time between a case when PCR jitters are generated and another case when PCR jitters are not generated, will be described with reference to FIGS. 3A and 3B.

FIG. 3A shows a relationship between the STC and the DTS when jitters exist in the PCR. FIG. 3B shows a relationship between the STC and the DTS when no jitters exist in the PCR. The point (real_vbv_delay_$STC_n$) of FIG. 3A shows a value of the STC at the time when a VBV delayed value of the n-th picture is detected in the second detector 22. The point (ideal_vbv_delay_$STC_n$) of FIG. 3B shows a value of the STC at the time when a VBV delayed value of the n-th picture is detected in the second detector 22 in a case when jitters do not exist in the PCR. Also, $STC_n$ and $DTS_n$ in FIGS. 3A and 3B represent the system time clock and the decoding time stamp of the n-th picture, respectively.

The value of the STC becomes consistent with a sum of the VBV delayed value ($vbv\_delay_n$) and the VBV delayed detection time value (ideal_vbv_delay_$STC_n$) at the start point of time of the variable-length decoding operation at the time when the actual buffer occupancy of the VBV buffer 23 becomes $B_n$. Therefore, the value of the $STC_n$ is equal to that of $DTS_n$ at the time when an actual buffer occupancy of the VBV buffer 23 is equal to the buffer occupancy $B_n$ calculated using the VBV delayed value ($vbv\_delay_n$) of the n-th picture if there is an ideal case having no jitters. However, when jitters exist, the value of the $STC_n$ has an STC difference due to jitters, at the time when an actual buffer occupancy is equal to the calculated buffer occupancy $B_n$. Accordingly, the value of the $STC_n$ does not match the value of the $DTS_n$.

Figure 4:
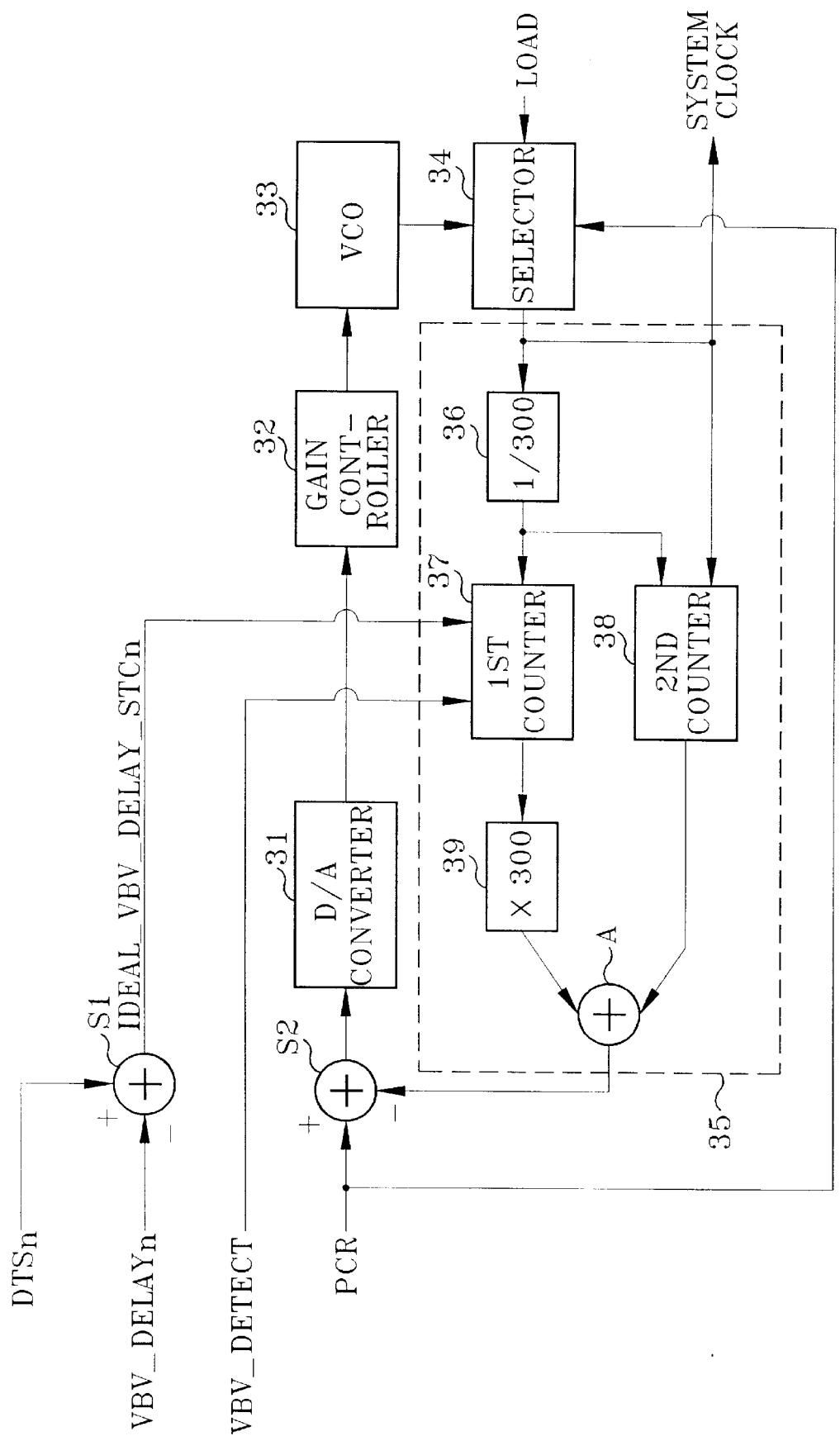
FIG. 4 is a detailed block diagram of the system clock generator of FIG. 2.

The system clock generator 30 shown in FIG. 4 includes a first subtracter S1 for receiving the $DTS_n$ and the VBV delayed value ($vbv\_delay_n$) involving the n-th picture from the depacketizer 10 and the second detector 22, respectively, and a PLL circuit composed of the other remaining blocks.

Referring to FIG. 4, the PCR supplied from the depacketizer 10 is supplied to a second subtracter S2 and a selector 34, respectively. The selector 34 generates a system clock corresponding to a value of the PCR of the depacketizer 10, and is controlled by a load signal (LOAD) applied when a decoding system is turned on or when there is a channel alteration, to transmit a PCR supplied from the depacketizer 10 to a counter 35. In this case, the value of the PCR equals the output value of the counter 35. Thus, a voltage controlled oscillator (VCO) 33 oscillates at a predetermined oscillating frequency. The STC generated by the VCO 33 is supplied to the selector 34. The frequency of the system clock output from the VCO 33 is 27 MHz in an MPEG system. The selector 34 supplies the clock output from the VCO 33 in a case when the load signal LOAD is not applied thereto.

Meanwhile, the first subtracter S1 subtracts the VBV delayed value ($vbv\_delay_n$) from the $STC_n$ indicating the decoding time, and outputs the VBV delayed detection time value (ideal_vbv_delay_$STC_n$) described with respect to FIG. 3B. Thus, when jitters exist in the PCR, the first subtracter S1 outputs an effective VBV delayed detection time value. Here, when the selector 34 supplies the clock of the VCO 33 to the counter 35, a first counter 37 receives a clock having a frequency of 90 KHz produced via a divider 36 which divides the frequency of the clock input from selector 34 by 300. A first counter 37, which is a 33-bit counter, is preset-enabled by a detection indication signal vbv_detect indicative of the detected VBV delayed value involving the n-th picture, and counts up the VBV delayed detection time value (ideal_vbv_delay_$STC_n$) loaded from the first subtracter S1 based on the 90 KHz input clock to thereby output the result. The output of the first counter 37 is supplied to an adder A via a multiplier 39 which multiplies the input by 300. A second counter 38, which is a 9-bit counter, is cleared by the 90 KHz clock applied to a clear terminal, and counts up the system clock of the 27 MHz frequency which is output from the selector 34 and is applied to a clock terminal. The second counter 38 sets a count value of "0" whenever the count value becomes 300. The output of the counter 38 is supplied to the adder A. The adder A adds the outputs of the multiplier 39 and the second counter 38 and supplies the added result to the second subtracter S2.

The second subtracter S2 subtracts the output value of the counter 35 from the value of the PCR output from the depacketizer 10 and applies the resultant value to a digital-to-analog (D/A) converter 31. A gain controller 32 gain-controls the output signal of the D/A converter 31 to be used in the VCO 33. Therefore, the VCO 33 generates the STC at a frequency at which the jitters are compensated.

The above-described embodiment has been described with respect to the transport stream. However, it is apparent to one having an ordinary skill in the art that a program stream can be applied to a variable-length decoding system in the same manner as that of the transport stream.

As described above, a system clock recovery apparatus for an MPEG decoding system according to the present invention can generate correct system clock even though jitters occur in a program clock reference (PCR) or a system clock reference (SCR). The correct system clock generation enables data to be variable-length-decoded accurately. Also, the correct system clock can prevent the occurrence of an overflow or an underflow in the VBV buffer due to an incorrect system time clock.

While only certain embodiments of the invention have been specifically described herein, it will apparent that numerous modifications may be made thereto without departing from the spirit and scope of the invention.

What is claimed is:

1. A system clock recovery apparatus in an MPEG decoding system for decoding a received system coded stream in the form of a transport stream or a program stream, the system clock recovery apparatus comprising:

depacketizer means for depacketizing the received stream and outputting decoding time data for representing a video decoding time, a system clock value and a video elementary stream;

detection means for detecting a delayed value of a video buffering verifier (VBV) using the video elementary stream of said depacketizer means, and generating a detection indication signal for indicating a detected point of time of the delayed value of the VBV; and system clock generation means for varying a current system clock and a current system time clock according to the decoding time data and the system clock value of said depacketizer means and the VBV delayed value and the detection indication signal of said detection means.

2. The system clock recovery apparatus according to claim 1, wherein said detection means comprises:

a first detector for detecting a picture start code using the video elementary stream; and a second detector for detecting the VBV delayed value based on the picture start code detected by said first detector.

3. The system clock recovery apparatus according to claim 1, wherein said system clock generation means comprises:

a first subtracter for subtracting the VBV delayed value from a value of the decoding time data and producing a VBV delayed detection time value; and a phase-locked loop (PLL) circuit for generating the current system clock according to the system clock value of said depacketizer means, and altering the frequency of the current system clock according to the detection indication signal and the VBV delayed detection time value of said first subtracter.

4. The system clock recovery apparatus according to claim 3, wherein said first subtracter subtracts the VBV delayed value from the value of the decoding time data corresponding to an identical picture.

5. The system clock recovery apparatus according to claim 3, wherein said VBV delayed detection time value is a time value of the point of time at which the VBV delayed value is detected when jitters do not exist in the system clock value.

6. The system clock recovery apparatus according to claim 3, wherein said PLL circuit comprises:

a second subtracter for calculating a difference value between the system clock value of said depacketizer means and a value of the current system clock;

an oscillator for performing an oscillation operation which alters the frequency of the current system clock according to the difference value calculated by said second subtracter, thereby producing a frequency-altered system clock; and a counter portion for generating the value of the current system clock using the detection indication signal, the VBV delayed detection time value, and the frequency-altered system clock of said oscillator.

7. The system clock recovery apparatus according to claim 6, wherein said counter portion comprises:

a divider for dividing the frequency of the current system clock by 300 and outputting the divided system clock;

a first counter which is preset-enabled by the detection indication signal and counts up the VBV delayed detection time value using the divided system clock of said divider as a first counter clock;

a second counter which is cleared by the divided system clock of said divider and performs a count operation using the current system clock as a second counter clock;

a multiplier for multiplying the output value of said first counter by 300; and an adder for adding the output value of said multiplier and the output value of said second counter to produce the value of the current system clock.

8. The system clock recovery apparatus according to claim 6, further comprising a selector for generating the system clock corresponding to the system clock value of said depacketizer means and selectively supplying the frequency-altered system clock of said oscillator and the generated system clock to said counter in response to power-on or channel-alteration of said decoding system.

9. The system clock recovery apparatus according to claim 8, wherein said selector supplies the generated system clock to said counter upon power-on or upon channel-alteration and otherwise supplies the system clock of said oscillator to said counter.

* * * * *